(12) United States Patent
Moriya et al.

(10) Patent No.: US 7,554,760 B2
(45) Date of Patent: Jun. 30, 2009

(54) RECORDING/REPRODUCING APPARATUS AND METHOD OF MEASURING A PARAMETER

(75) Inventors: Makoto Moriya, Tokyo (JP); Kazuya Shimakawa, Tokyo (JP); Kuniyasu Ito, Tokyo (JP)

(73) Assignee: TDK Corporation, Tokyo (JP)

( * ) Notice: Subject to any disclaimer, the term of this patent is extended or adjusted under 35 U.S.C. 154(b) by 283 days.

(21) Appl. No.: 11/557,571

(22) Filed: Nov. 8, 2006

(65) Prior Publication Data

US 2007/0115580 A1 May 24, 2007

(30) Foreign Application Priority Data

Nov. 21, 2005 (JP) ............................. 2005-336155
Jul. 28, 2006 (JP) ............................. 2006-205856

(51) Int. Cl.
*G11B 5/455* (2006.01)
(52) U.S. Cl. ..................... 360/77.04; 360/48
(58) Field of Classification Search ....................... None
See application file for complete search history.

(56) References Cited

U.S. PATENT DOCUMENTS

| | | | | |
|---|---|---|---|---|
| 5,596,463 | A * | 1/1997 | Hashimoto | 360/77.08 |
| 5,859,740 | A * | 1/1999 | Takeda et al. | 360/77.02 |
| 7,173,788 | B2 | 2/2007 | Nakamura et al. | 360/77.08 |
| 7,203,025 | B2 * | 4/2007 | Kaizu et al. | 360/77.08 |
| 7,265,930 | B2 | 9/2007 | Nakamura et al. | 360/77.08 |
| 7,352,526 | B2 * | 4/2008 | Takaishi | 360/77.08 |
| 2005/0117253 | A1 | 6/2005 | Moriya et al. | |
| 2005/0128632 | A1 | 6/2005 | Nakamura et al. | |
| 2005/0233176 | A1 | 10/2005 | Takai et al. | |
| 2006/0077880 | A1 | 4/2006 | Moriya et al. | |
| 2006/0198042 | A1 | 9/2006 | Kaizu et al. | |

(Continued)

FOREIGN PATENT DOCUMENTS

CN 1627429 6/2005

(Continued)

OTHER PUBLICATIONS

English language Abstract of CN 1627429, Jun. 15, 2005.

(Continued)

*Primary Examiner*—Hoa T. Nguyen
*Assistant Examiner*—James L Habermehl
(74) *Attorney, Agent, or Firm*—Greenblum & Bernstein, P.L.C.

(57) ABSTRACT

A recording/reproducing apparatus includes: a magnetic recording medium on which data track patterns are formed in data track pattern regions by a pattern with recording regions and non-recording regions and on which servo patterns are formed in servo pattern regions by the pattern; a recording head that writes signals on the medium; a reproducing head that reads signals written on the medium; and a control unit that controls the writing of signals by the recording head and the reading of signals by the reproducing head and measures a predetermined parameter for at least one of the recording head and the reproducing head by writing and reading measurement signals on the medium. The control unit writes the measurement signals using the recording head on first recording regions formed continuously in a radial direction of the medium out of the recording regions formed in the servo pattern regions, reads the measurement signals using the reproducing head, and measures the parameter based on the read measurement signals.

6 Claims, 8 Drawing Sheets

U.S. PATENT DOCUMENTS

2006/0198052 A1 9/2006 Soeno et al.
2006/0203368 A1 9/2006 Kaizu et al.
2006/0203386 A1 9/2006 Soeno et al.
2006/0250718 A1 11/2006 Nakamura et al.

FOREIGN PATENT DOCUMENTS

| JP | 2005-166115 | 6/2005 |
|----|-------------|--------|
| JP | 2005-166116 | 8/2005 |

OTHER PUBLICATIONS

U.S. Appl. No. 11/577,533, to Ito et al., filed Nov. 8, 2006.
U.S. Appl. No. 11/536,954, to Hattori et al., filed Sep. 29, 2006.
U.S. Appl. No. 11/536,846, to Hattori et al., filed Sep. 29, 2006.
English language Abstract of JP 2005-166115.
English language Abstract of JP 2005-166116.

* cited by examiner

F I G. 7
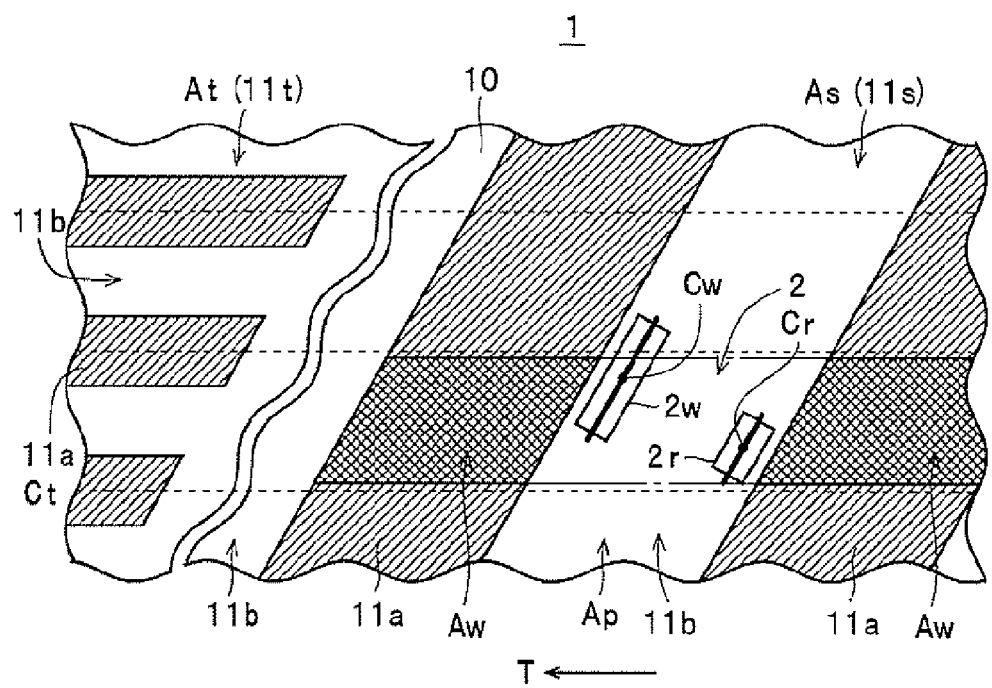
F I G. 8
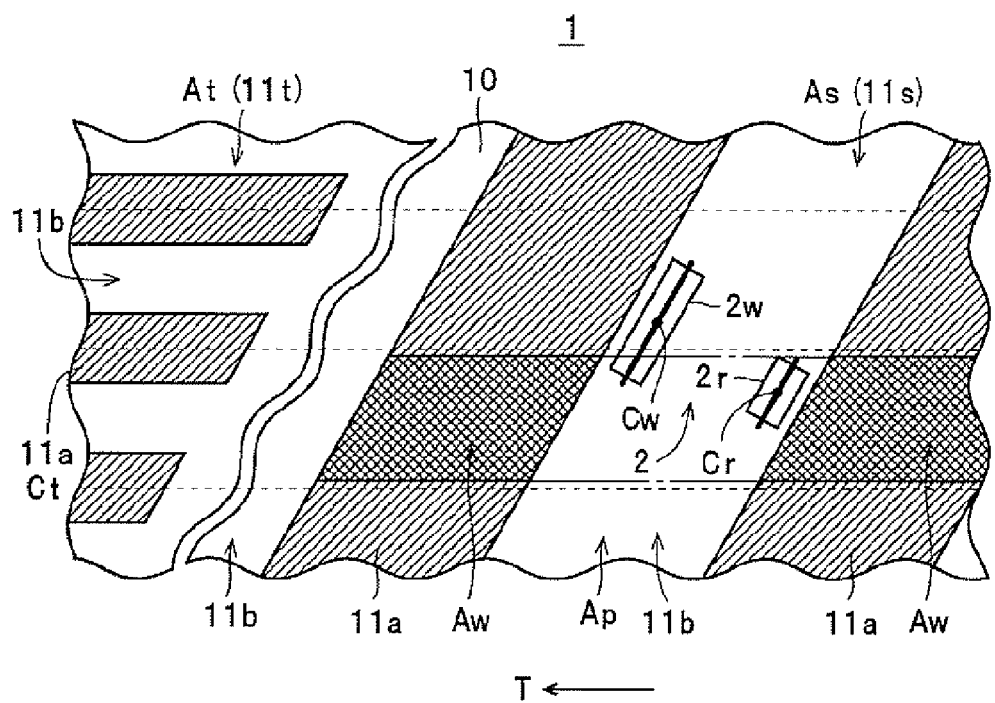

F I G. 1 1
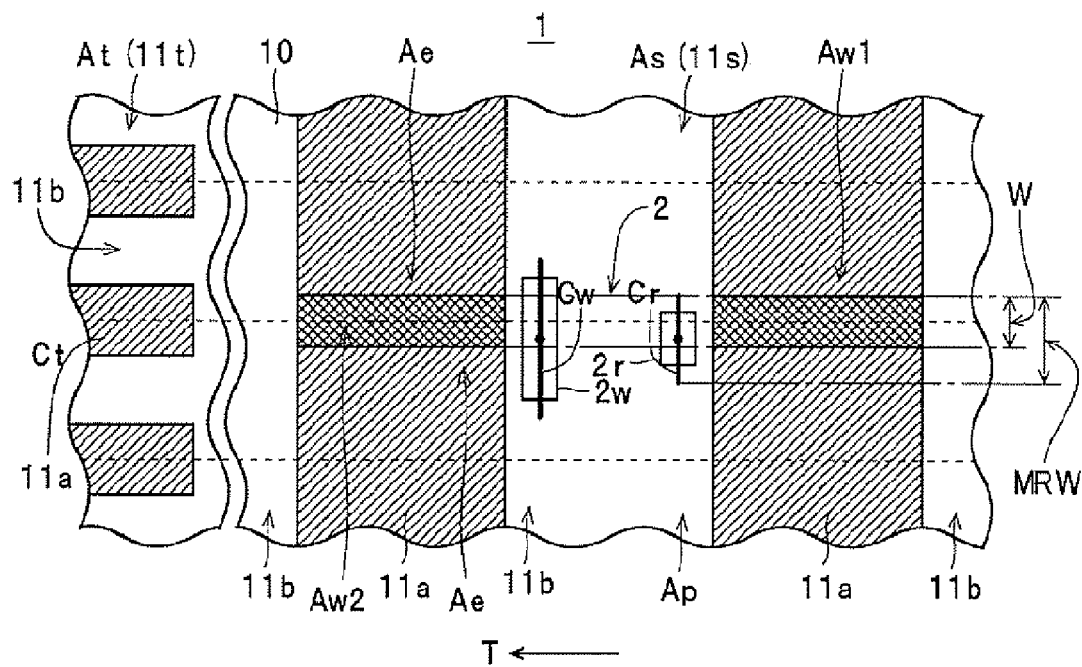
F I G. 1 2
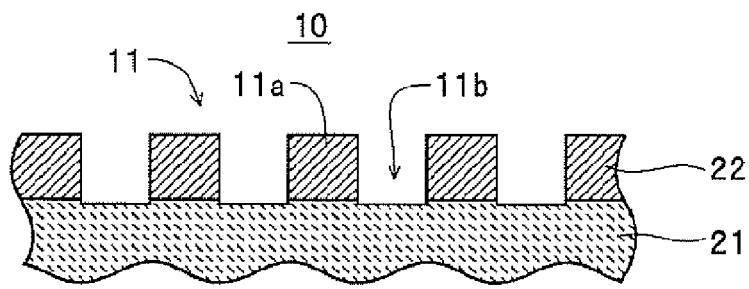
F I G. 1 3
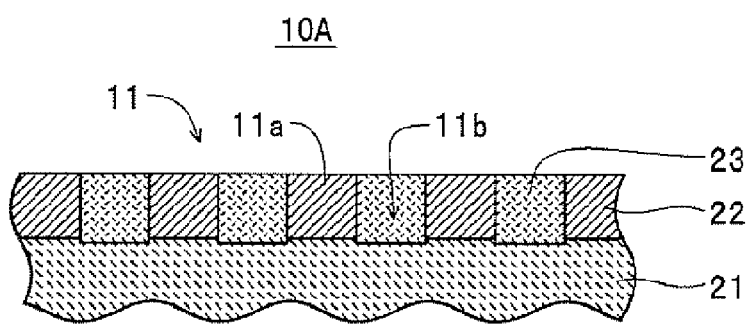

RECORDING/REPRODUCING APPARATUS AND METHOD OF MEASURING A PARAMETER

BACKGROUND OF THE INVENTION

1. Field of the Invention

The present invention relates to a recording/reproducing apparatus including a magnetic recording medium on which a data track pattern and a servo pattern are formed by patterns with recording regions and non-recording regions, a recording head, and a reproducing head. The invention also relates to a method of measuring a parameter that measures a predetermined parameter for at least one of a recording head and a reproducing head installed in a recording/reproducing apparatus.

2. Description of the Related Art

As one example of a recording/reproducing apparatus that can measure a predetermined parameter for at least one of a recording head and a reproducing head using this type of method of measuring a parameter, Japanese Laid-Open Patent Publication No. 2005-166115 discloses a hard disk drive apparatus (a "magnetic recording apparatus") with an offset measuring function. This hard disk drive apparatus includes a discrete track-type hard disk (magnetic recording medium) where non-magnetic regions are formed between tracks in discrete regions (data track pattern regions), a composite magnetic head including a recording head and a reproducing head, a driving mechanism that moves the magnetic head between the inner periphery and the outer periphery of the hard disk, and a control unit that carries out overall control of the hard disk drive apparatus. The hard disk described above is provided with offset measurement regions that are used for carrying out an offset measuring process and are disposed between the discrete regions (data track pattern regions) for recording data and the servo regions (servo pattern regions) in which servo data is recorded. The offset measurement regions are entirely constructed of a magnetic material without non-magnetic regions being formed therein.

During an offset measuring process carried out by this hard disk drive apparatus, offset measurement signals (measurement patterns, hereinafter also referred to simply as "measurement signals") are written in offset measurement regions on the hard disk in a state where data has not been recorded on the hard disk and the offset measurement regions have been initialized. More specifically, in a state where the reproducing head is being made on-track to an innermost track, for example, measurement signals are written in the offset measurement regions using the recording head. When doing so, in a hard disk drive apparatus of this type, when the magnetic head has been moved toward the inner periphery or the outer periphery of the hard disk, a line that joins the center in the width direction of the recording head and the center in the width direction of the reproducing head (as one example, a line that is parallel to the direction in which the arm extends) is intersected by the center line of a track (i.e., a skew angle is produced). Accordingly, when the reproducing head is being made on-track (i.e., when the center in the width direction of the reproducing head has been aligned with the center in the width direction of a track), the center in the width direction of the recording head will be positioned away from the center of the track, or in other words, the recording head will be made "off-track". This means that the measurement signals will be recorded at positions that are separated from the center line of the track by a distance corresponding to the extent to which the recording head is made off-track.

Next, by reading the measurement signals using the reproducing head, the center in the radial direction of the regions in which the measurement signals were written, or in other words, a position that matches the center in the width direction of the recording head when the measurement signals were written is specified. More specifically, by moving the reproducing head in the radial direction of the hard disk by increments of a predetermined amount, the measurement signals are read from the offset measurement regions. Here, when the center in the width direction (i.e., the radial direction) of the reproducing head is positioned off the center in the radial direction of the regions where the measurement signals are written toward the inner periphery or the outer periphery, the amplitude of the reproducing signal for the read measurement signal decreases. On the other hand, when the center in the width direction (i.e., the radial direction) of the reproducing head matches the center in the radial direction of the regions where the measurement signals were written, the amplitude of the reproducing signal for the read measurement signal reaches its maximum value. Accordingly, the control unit specifies the center position of the reproducing head at a point where the amplitude of the reproducing signal for the measurement signals reaches its maximum value as the center in the radial direction of the regions in which the measurement signals were written and sets the distance between the specified center and the center of the reproducing head during the writing of the measurement signals (i.e., the center of the track) as the offset of the recording head with respect to the reproducing head, thereby completing the measurement process.

SUMMARY OF THE INVENTION

However, by investigating the offset measurement process carried out by the conventional hard disk drive apparatus, the present inventors found the following problem. That is, the conventional hard disk drive apparatus is constructed so that offset measurement regions are provided between the discrete regions and the servo regions and measurement signals for measuring the offset are written in such regions. To enable the measurement signals to be written, the offset measurement regions are formed entirely of magnetic material without non-magnetic regions being formed therein. This means that it is not possible to record data or to record servo data (i.e., to form a servo pattern including recording regions formed of magnetic material and the non-magnetic regions described above) in the offset measurement regions. Accordingly, in the conventional hard disk drive, there is the problem of a fall in the recording capacity of the hard disk due to the offset measurement regions, whose only purpose is the measurement of offsets, occupying valuable space on the hard disk.

The present invention was conceived in view of the problem described above and it is a principal object of the present invention to provide a recording/reproducing apparatus and a method of measuring a parameter that can measure a predetermined parameter for at least one of a recording head and a reproducing head without reducing the recordable area.

To achieve the stated object, a recording/reproducing apparatus according to the present invention includes: a magnetic recording medium on which data track patterns are formed in data track pattern regions by a pattern with recording regions and non-recording regions and on which servo patterns are formed in servo pattern regions by the pattern with the recording regions and the non-recording regions; a recording head that writes signals on the magnetic recording medium; a reproducing head that reads signals written on the magnetic recording medium; and a control unit that controls writing of the signals by the recording head and reading of the signals by the reproducing head and measures a predetermined parameter for at least one of the recording head and the reproducing head by writing and reading measurement signals on the magnetic recording medium, wherein when measuring the predetermined parameter, the control unit writes the measurement signals using the recording head on first recording regions that are formed continuously in a radial direction of the magnetic recording medium out of a plurality of the recording regions formed in the servo pattern regions, reads the measurement signals using the reproducing head, and measures the predetermined parameter based on a result of reading the measurement signals.

Note that the expression "recording regions" in this specification refers to regions constructed so as to retain a recorded magnetic signal in a readable manner (that is, regions constructed so as to have the ability to retain a magnetic signal in a readable manner). The expression "non-recording regions" in this specification are regions constructed so that the ability thereof to retain a magnetic signal in a readable manner is lower than that of the recording regions, or regions constructed so as to effectively not have such ability. More specifically, the "non-recording regions" in this specification are regions from which a smaller magnetic field is emitted than that emitted from the recording regions in a state where a magnetic signal has been recorded, or regions from which effectively no magnetic field is emitted. In addition, for a construction where a plurality of recording regions are connected as if to form a single recording region in the inner periphery or the outer periphery of the magnetic recording medium, for example, the expression "recording regions" in this specification refers to individual recording regions that are separated in the circumferential direction by the non-recording regions.

A method of measuring a parameter according to the present invention measures a parameter for at least one of a recording head and a reproducing head of a recording/reproducing apparatus including: a magnetic recording medium on which data track patterns are formed in data track pattern regions by a pattern with recording regions and non-recording regions and on which servo patterns are formed in servo pattern regions by the pattern with the recording regions and the non-recording regions; a recording head that writes signals on the magnetic recording medium; and a reproducing head that reads signals written on the magnetic recording medium, the method comprising writing and reading measurement signals on the magnetic recording medium of the recording/reproducing apparatus, thereby measuring a predetermined parameter for at least one of the recording head and the reproducing head, wherein the writing the measurement signals is performed using the recording head on first recording regions that are formed continuously in a radial direction of the magnetic recording medium out of a plurality of the recording regions formed in the servo pattern regions, the reading the measurement signals is performed using the reproducing head, and the measuring the predetermined parameter is performed based on a result of the reading the measurement signals.

According to this recording/reproducing apparatus and this method of measuring a parameter, by measuring a predetermined parameter by writing the measurement signals using the recording head on the first recording regions that are formed continuously in a radial direction out of the plurality of recording regions formed in the servo pattern regions and DC magnetizing the first recording regions used during the measurement process for the predetermined parameter after the measurement process has been completed, it becomes possible to use such first recording regions as normal servo patterns. Accordingly, it becomes possible to measure a predetermined parameter for at least one of the recording head and the reproducing head without having to provide regions dedicated to the measurement processes that cannot be used to record data or to record servo patterns. As a result, it is possible to provide a recording/reproducing apparatus and a method of measuring a parameter that can measure a predetermined parameter for at least one of the recording head and the reproducing head without reducing the recordable area.

In the recording/reproducing apparatus according to the present invention, as measurement of the predetermined parameter, the control unit may measure a distance in the radial direction of she magnetic recording medium between a center of a length of the recording head in a direction corresponding to the radial direction and a center of a length of the reproducing head in a direction corresponding to the radial direction.

According to this recording/reproducing apparatus, by measuring the distance in the radial direction between the center of the recording head and the center of the reproducing head as measurement of the predetermined parameter, it is possible to properly measure the distance described above (i.e., the offset) for the entire range from the inner periphery to the outer periphery of the magnetic recording medium in various types of recording/reproducing apparatuses where the relative positional relationship between the recording head and the reproducing head differs due to manufacturing errors and differences between individual components. As a result, it is possible to make the recording head and the reproducing head reliably on-track to each track on the magnetic recording medium.

In addition, in the recording/reproducing apparatus according to the present invention, as measurement of the predetermined parameter, the control unit may measure at least one of a magnetic write width of the recording head and a magnetic read width of the reproducing head.

According to this recording/reproducing apparatus, it is possible to properly measure the magnetic write width and the magnetic read width in a state where a magnetic recording medium that has been actually installed in the recording/reproducing apparatus has been combined with the recording head and the reproducing head. By doing so, various control parameters for tracking servo control can be finely adjusted for each actual recording/reproducing apparatus based on the measured magnetic write width and magnetic read width. It is also possible to finely adjust the write current based on the measured magnetic write width and to adjust the gain based on the measured magnetic read width. Accordingly, it is possible to provide a recording/reproducing apparatus that can reliably record data and can reliably read the recorded data and the servo data across the entire range from the inner periphery to the outer periphery of the magnetic recording medium.

Also, in the recording/reproducing apparatus according to the present invention, when measuring the predetermined parameter, the control unit may write the measurement signals on only some of the first recording regions that are set in advance out of the first recording regions formed in the servo pattern regions.

According to this recording/reproducing apparatus, it is possible to carry out proper tracking servo control during the measurement processes using the first recording regions in which measurement signals are not written during the measurement processes as recording regions of normal servo patterns. Accordingly, it is possible to sufficiently improve the measurement results of the measurement processes.

Also, in a recording/reproducing apparatus according to the present invention, when measuring the predetermined parameter, the control unit may write the measurement signals on the first recording regions in servo pattern regions that are not adjacent to the servo pattern regions where the first recording regions on which the measurement signals have been written are formed in the circumferential direction of the magnetic recording medium.

According to this recording/reproducing apparatus, it is possible to carry out proper tracking servo control during the measurement processes using the recording regions in the servo pattern regions on whose first recording regions the measurement signals were not written during the measurement processes as recording regions of normal servo patterns. Accordingly, it is possible to sufficiently improve the reliability of the measurement results of the measurement processes.

It should be noted that the disclosure of the present invention relates to the contents of Japanese Patent Application 2005-336155 that was filed on 21 Nov. 2005 and Japanese Patent Application 2006-205856 that was filed on 28 Jul. 2006, the entire contents of both of which are herein clearly incorporated by reference.

BRIEF DESCRIPTION OF THE DRAWINGS

These and other objects and features of the present invention will be explained in more detail below with reference to the attached drawings, wherein:

FIG. 7 is a plan view of the magnetic disk and the magnetic head in a state where measurement signals are being read from convex parts in the preamble pattern region;

FIG. 8 is another plan view of the magnetic disk and the magnetic head in a state where measurement signals are being read from convex parts in the preamble pattern region;

FIG. 11 is a plan view of the magnetic disk and the magnetic head in a state where a measurement signal is being read from a convex part in the preamble pattern region after the AC erase process has been completed;

FIG. 12 is a cross-sectional view of a magnetic disk;

FIG. 13 is a cross-sectional view of another magnetic disk;

DESCRIPTION OF THE PREFERRED EMBODIMENTS

Preferred embodiments of a recording/reproducing apparatus and a method of measuring a parameter according to the present invention will now be described with reference to the attached drawings.

First, the construction of the recording/reproducing apparatus according to the present invention will be described with reference to the drawings.

Figure 1:
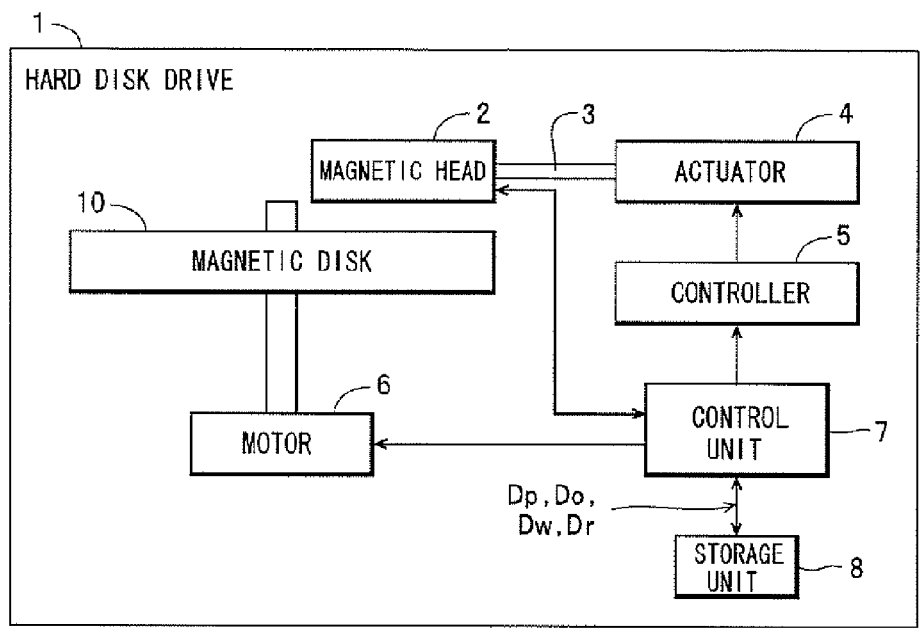
FIG. 1 is a block diagram showing the construction of a hard disk drive.
Figure 2:
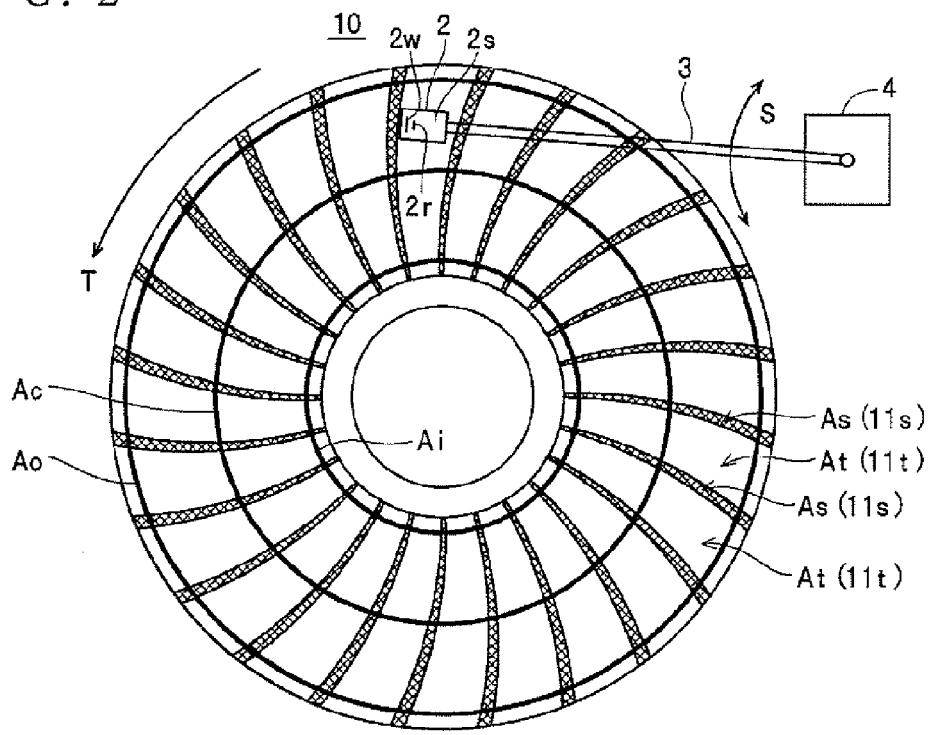
FIG. 2 is a plan view of a magnetic disk.

The hard disk drive 1 shown in FIG. 1 is one example of a recording/reproducing apparatus according to the present invention and includes a magnetic head 2, an arm 3, an actuator 4, a controller 5, a motor 6, a control unit 7, a storage unit 8, and a magnetic disk 10. The magnetic disk 10 is a discrete track-type magnetic recording medium and as shown in FIG. 2, servo pattern regions As are provided between data track pattern regions At so that the servo pattern regions As and the data track pattern regions At are alternately disposed in the direction of rotation (the direction of the arrow T) of the magnetic disk 10. Note that in this specification, a region sandwiched by two data track pattern regions At that are disposed in the direction of rotation (i.e., a region from a downstream end in the direction of rotation of one data track pattern region At to an upstream end in the direction of rotation of another data track pattern region At) is referred to as a "servo pattern region As".

Figure 3:
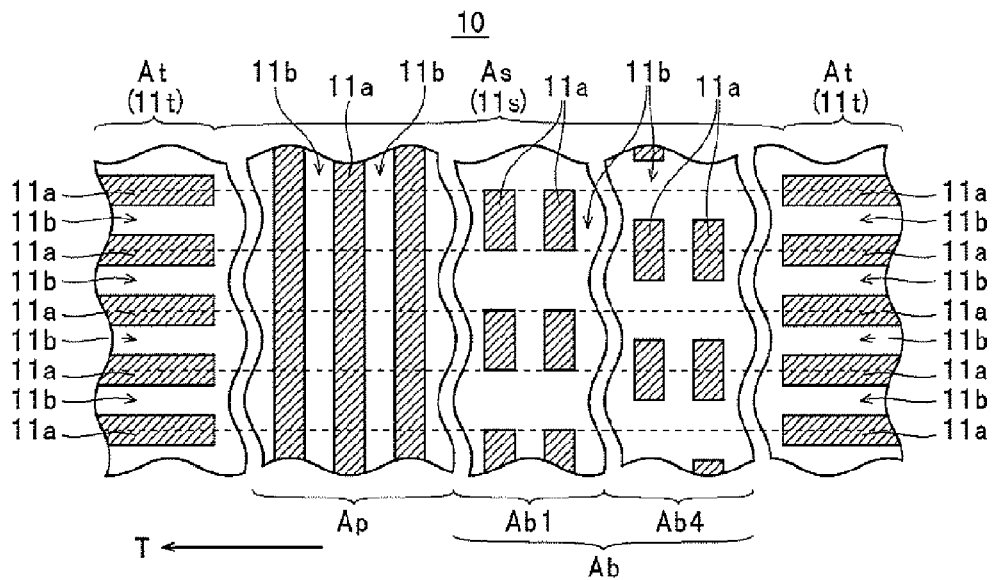
FIG. 3 is a plan view of two data track pattern regions and a servo pattern region on the magnetic disk.

As shown in FIG. 3, a magnetic layer is formed in each data track pattern region At. This magnetic layer is composed of a concave/convex pattern 11 (a concave/convex pattern 11t: one example of a "pattern with recording regions and non-recording regions" for the present invention) including a plurality of convex parts 11a that construct a large number of concentric data recording tracks produced by dividing the region with a predetermined arrangement pitch and a plurality of concave parts 11b that construct guard band parts. Note that on the magnetic disk 10, the formation regions of the convex parts ha correspond to "recording regions" and the formation regions of the concave parts 11b correspond to "non-recording regions" for the present invention. Also, in FIG. 3 and in FIGS. 6 to 11 and 17 described later, the formation positions of the convex parts 11a are obliquely shaded and the formation positions of the concave parts 11b are unshaded. Here, at least protruding end parts of the convex parts 11a formed in the data track pattern regions At (as one example, substantially all of the convex parts 11a from the base end parts to the protruding end parts thereof) are formed of a magnetic material that constructs the magnetic layer described above, with such convex parts 11a being continuously formed in the circumferential direction (i.e., the direction of rotation) of the magnetic disk 10 in long belt-like shapes elongated in the circumferential direction. As one example, the convex parts 11a and the concave parts 11b inside the data track pattern regions At are set so that the lengths thereof in the radial direction are substantially equal and the formation pitch of the convex parts 11a (that is, the track pitch of the data recording tracks) and the lengths in the radial direction (that is, the length in the radial direction of the data recording tracks and the guard band parts) are set so as to be substantially equal across the entire range from the inner periphery Ai to the outer periphery Ao of the magnetic disk 10.

As shown in FIG. 3, the magnetic layer is also formed in each servo pattern region As. The magnetic layer is composed of a concave/convex pattern 11 (a concave/convex pattern 11s: another example of "a pattern with recording regions and non-recording regions" for the present invention) that includes a plurality of convex parts 11a and a plurality of concave parts 11b constructing a variety of servo patterns used for tracking servo control. More specifically, a preamble pattern region Ap in which a preamble pattern is formed by the concave/convex pattern 11s, an address pattern formation region (not shown) in which an address pattern is formed by the concave/convex pattern 11s, and a burst pattern region Ab in which burst patterns are formed by the concave/convex pattern 11s are set in each servo pattern region As. Four regions Ab1 to Ab4 corresponding to signal regions of the burst patterns are also set inside each burst pattern region Ab (only the regions Ab1, Ab4 are shown in FIG. 3). On the hard disk drive 1, servo signals for tracking servo control are read from the servo pattern regions As in a state where the magnetic disk 10 is rotated at a constant angular velocity. For this reason, as shown in FIG. 2, on the magnetic disk 10, the length in the circumferential direction of the servo pattern regions As is set so as to gradually increase from the inner periphery Ai to the outer periphery Ao, and together with this, the lengths in the circumferential direction of various regions such as the preamble pattern regions Ap, the address pattern regions, and the burst pattern regions Ab are set so as to gradually increase from the inner periphery Ai to the outer periphery Ao.

At least protruding end parts of the convex parts 11a formed in the preamble pattern region Ap in each servo pattern region As are formed of the magnetic material that constructs the magnetic layer described above (as one example, substantially all of the convex parts 11a from the base end parts to the protruding end parts thereof), with such convex parts 11a being continuously formed in the radial direction of the magnetic disk 10 in long belt-like shapes elongated in the radial direction. The convex parts 11a formed inside each preamble pattern region Ap are one example of "first recording regions" for the present invention and are formed so that the length thereof in the radial direction is substantially equal from the inner periphery Ai to the outer periphery Ao of the magnetic disk 10. The convex parts 11a formed in each preamble pattern region Ap are formed so that the length thereof in the circumferential direction gradually increases from the inner periphery Ai to the outer periphery Ao. Note that the concave parts 11b formed in each preamble pattern region Ap are formed so that the length thereof in the radial direction is substantially equal to the length in the radial direction of the convex parts 11a and the length thereof in the circumferential direction is substantially equal to the length in the circumferential direction of the convex parts 11a at positions with the same radius. Also, as one example, around thirty convex parts 11a are formed in each preamble pattern region Ap on the magnetic disk 10.

In the address pattern formation region in each servo pattern region As, like the convex parts 11a formed in the preamble pattern region Ap described above, a plurality of convex parts 11a are formed as convex parts used as sector address patterns (not shown). These convex parts 11a are another example of "first recording regions" for the present invention and are long in the radial direction. At least protruding end parts of these convex parts 11a are formed of the magnetic material that constructs the magnetic layer described above (as one example, substantially all of the convex parts 11a from the base end parts to the protruding end parts thereof). On the other hand, the convex parts 11a formed in the regions Ab1 to Ab4 of the burst pattern region Ab in each servo pattern region As construct unitary burst regions of each burst pattern. At least protruding end parts of these convex parts 11a are formed of the magnetic material that constructs the magnetic layer described above (as one example, substantially all of the convex parts 11a from the base end parts to the protruding end parts thereof), As one example, these convex parts 11a are formed so that the length thereof in the radial direction corresponds to the track pitch and the length thereof in the circumferential direction is substantially equal to the length in the circumferential direction of the convex parts 11a in the preamble pattern region Ap at positions with the same radius.

Figure 4:
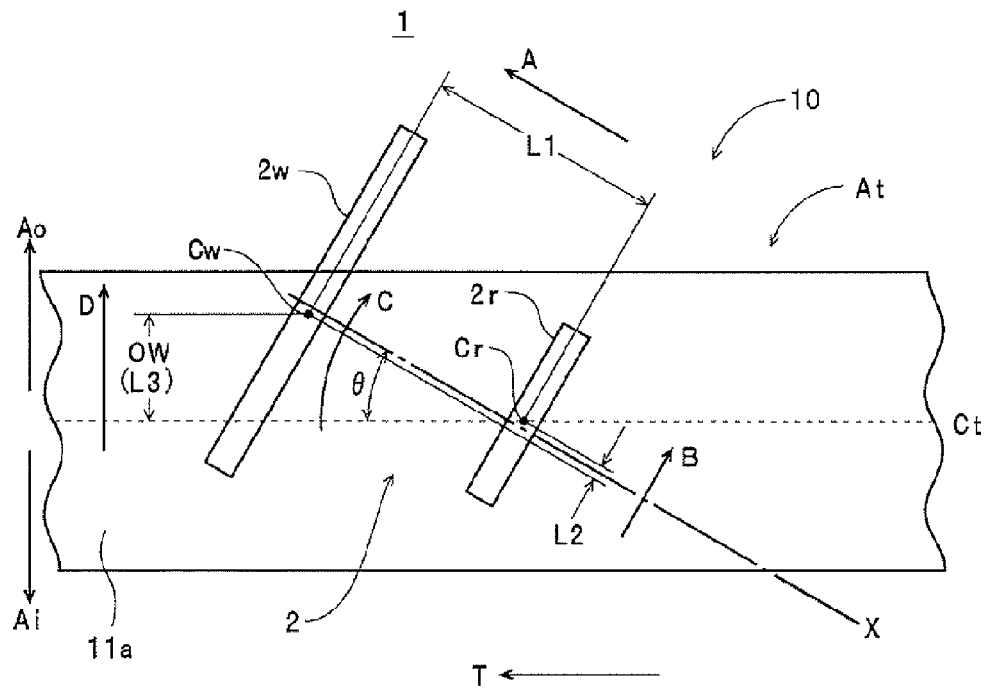
FIG. 4 is a diagram useful in explaining the sizes of a recording head and a reproducing head on a magnetic head.

On the other hand, as shown in FIG. 2, the magnetic head 2 is a composite magnetic head where a recording head 2w and a reproducing head 2r are disposed on the base surface of a slider 2s and is attached via the arm 3 to the actuator 4. On the magnetic head 2, as one example, the recording head 2w is provided on the front end side of the slider 2s and the reproducing head 2r is provided on the base end side (the arm 3 side) of the slider 2s. As shown in FIG. 4, the reproducing head 2r and the recording head 2w are formed on the magnetic head 2 so that the center Cw of the recording head 2w (the center of the length in a direction corresponding to the radial direction: a center of the length in the direction of seek operations) is a distance L1 apart from the center Cr of the reproducing head 2r (the center of the length in a direction corresponding to the radial direction: the center of the length in the direction of seek operations). Note that in FIG. 4 and in FIGS. 5 to 11 described later, for ease of understanding the present invention, the lengths of the various parts of the reproducing head 2r and the recording head 2w, the distance between the reproducing head 2r and the recording head 2w, and the like are shown differently to the actual lengths and distance. The dot-dash line X shown in FIG. 4 is a virtual line showing the direction in which the arm 3 extends, that is, the direction in which a rotation shaft of the actuator 4 is located, and in the following explanation, out of the lengths of the various parts of the magnetic head 2, lengths in a direction that is perpendicular to the dot-dash line X are referred to as "widths". Also, in the present specification, the distance L1 in the direction in which the arm 3 extends (i.e., the direction of the dot-dash line X) between the center Cr of the reproducing head 2r and the center Cw of the recording head 2w is expressed with the center Cr of the reproducing head 2r as the origin and with distances in the direction from the base end toward the front end of the arm 3 (i.e., the direction shown by the arrow A in FIG. 4) as positive distances.

The reproducing head 2r and the recording head 2w should preferably be formed so that the center Cr of the reproducing head 2r and the center Cw of the recording head 2w are not separated in the width direction of the magnetic head 2 (as one example, so that both centers Cr, Cw are located on the dot-dash line X). However, on this type of magnetic head, due to manufacturing errors, the center Cr of the reproducing head 2r and the center Cw of the recording head 2w may be separated by the distance L2 in the width direction of the magnetic head 2. Note that in the present specification, the distance L2 in the width direction between the center Cr of the reproducing head 2r and the center Cw of the recording head 2w is expressed with the center Cr of the reproducing head 2r as the origin and with distances in the direction from the inner periphery Ai of the magnetic disk 10 toward the outer periphery Ao in a state where the magnetic head 2 has been disposed over the magnetic disk 10 (i.e., the direction of the arrow B) as positive distances. On the other hand, in the hard disk drive 1 where the magnetic head 2 (the arm 3) carries out seek operations around a single rotation shaft (i.e., the actuator 4), when the magnetic head 2 is located in the inner periphery Ai or the outer periphery Ao of the magnetic disk 10 for example, as shown in FIG. 4 a skew angle 9 whose value corresponds to the position of the magnetic head 2 is produced. Note that in FIG. 4 and in FIGS. 6 to 8 described later, for ease of understanding the present invention, the skew angle $\theta$ is shown differently to the actual angle. In this specification, the skew angle $\theta$ described above is expressed with angles in the direction shown by the arrow Cr that is, angles on the outer periphery Ao side of a line that is parallel to the track center Ct as positive angles and angles on the inner periphery Ai side of the line as negative angles.

As described earlier, since the recording head $2w$ is separated from the reproducing head $2r$ by the distance L1, as shown in FIG. 4, in a state where the skew angle $\theta$ is produced, when the center Cr of the reproducing head $2r$ matches the track center Ct for example (i.e., when the reproducing head $2r$ is made on-track), the center Cw of the recording head $2w$ will be positioned away from the track center Ct (i.e., the recording head $2w$ will be made off-track). The distance L3 by which the recording head $2w$ is made off-track, i.e., the distance in the radial direction between the center Cr of the reproducing head $2r$ and the center Cw of the recording head $2w$ in a state where the skew angle $\theta$ has been produced differs according to the magnitude of the skew angle $\theta$. More specifically, the distance L3 is given by the equation "distance L3=distance L1×sin $\theta$+distance L2×cos $\theta$". Accordingly, to carry out tracking control to make the reproducing head $2r$ on-track to a desired track when servo data and recorded data is being read by the reproducing head $2r$ and to make the recording head $2w$ on-track to a desired track when data is being recorded by the recording head $2w$, it is necessary to measure the distance L3 described above, that is, the offset OW (one example of a "predetermined parameter" for the present invention) between the center Cr of the reproducing head $2r$ and the center Cw of the recording head $2w$ across the entire range of the magnetic disk 10 from the inner periphery Ai to the outer periphery Ao and to store the measurement results associated with the tracks in advance as offset data Do. Note that in this specification, the offset OW between the center Cr of the reproducing head $2r$ and the center Cw of the recording head $2w$ is expressed with the center Cr of the reproducing head $2r$ as the origin and with distances in the direction from the inner periphery Ai to the outer periphery Ao in the radial direction of the magnetic disk 10 (i.e., the direction of the arrow D) as positive distances.

Figure 5:
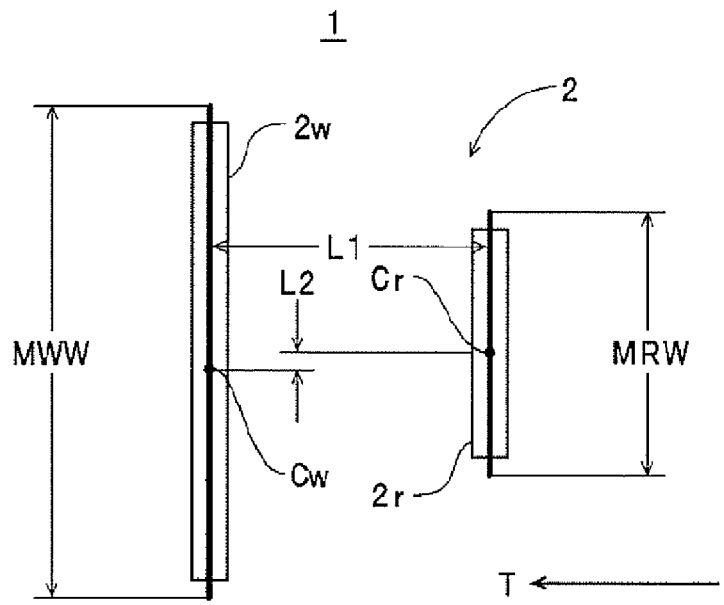
FIG. 5 is a diagram useful in explaining the magnetic write width of the recording head and the magnetic read width of the reproducing head on the magnetic head.

As shown in FIG. 5, on the magnetic head 2, the recording head $2w$ is formed wider than the reproducing head $2r$. Accordingly, with the magnetic head 2, the magnetic write width MWW of the recording head $2w$ is wider than the magnetic read width MRW of the reproducing head $2r$. Here, across the entire range of the magnetic disk 10, to reliably read the servo data and the recorded data using the reproducing head $2r$ and to reliably record data using the recording head $2w$, it is preferable to measure the magnetic write width MWW and the magnetic read width MRW described above (other examples of "predetermined parameters" for the present invention), to store the measurement results as write width data Dw and read width data Dr, and to finely adjust various control parameters for tracking servo control of the actual device based on the stored data Dw and Dr. Accordingly, as described later, the hard disk drive 1 is constructed to carry out a measurement process that measures the offset OW described above across the entire range from the inner periphery Ai to the outer periphery Ao and stores offset data Do for each track in the storage unit 8 and to also carry out a measurement process that measures the magnetic write width MWW and the magnetic read width MRW in a central periphery Ac for example and stores the write width data Dw and the read width data Dr in the storage unit 8.

On the other hand, in accordance with control by the controller 5, the actuator 4 causes the arm 3 to rotate (seek) in the direction of the arrow S shown in FIG. 2. Also, in accordance with control by the control unit 7, the controller 5 controls the actuator 4 to cause the arm 3 to rotate and thereby make the magnetic head 2 on-track to a desired track on the magnetic disk 10. In the same way, in accordance with control by the control unit 7, the motor 6 rotates the magnetic disk 10 at a constant rotational velocity, such as 5400 rpm. The control unit 7 carries out overall control of the hard disk drive 1. More specifically, the control unit 7 controls the controller 5 to drive the actuator 4 and thereby make the magnetic head 2 on-track to a desired track on the magnetic disk 10 and controls writes of data by the recording head $2w$ and reads of the servo data and the recorded data by the reproducing head $2r$. Also, in accordance with the method of measuring a parameter according to the present invention, the control unit 7 carries out the measurement processes that measure the offset OW, the magnetic write width MWW and the magnetic read width MRW. The storage unit 8 stores a measurement process program Dp for the measurement processes described above that are carried out by the control unit 7 and also stores the offset data Do, the write width data Dw, the read width data Dr, and the like generated by the measurement processes.

Next, the measurement process for measuring the offset OW using the hard disk drive 1 will be described with reference to the drawings. Note that before the magnetic disk 10 installed in the hard disk drive 1 is enclosed inside the case (not shown) of the hard disk drive 1, the data track pattern regions At and servo pattern regions As are entirely DC magnetized.

As one example, when a control signal indicating the start of a measuring process has been outputted from an external apparatus to the hard disk drive 1 in a state where power is being supplied to the hard disk drive 1, the control unit 7 starts the measurement process that measures the offset OW. Here, the control unit 7 first controls the controller 5 to move the magnetic head 2 to the inner periphery Ai of the magnetic disk 10 and, while moving the magnetic head 2 toward the outer periphery Ao, carries out an AC erase process on all of the convex parts $11a$ in the data track pattern regions At and the convex parts $11a$ inside the preamble pattern regions Ap of predetermined servo pattern regions As out of the servo pattern regions As. More specifically, a signal with a higher frequency than the frequency of the signal used to record the data on the data recording tracks in the data track pattern regions At is written using the recording head $2w$ onto all of the convex parts $11a$ in the data track pattern regions At and the convex parts $11a$ inside the preamble pattern regions Ap of the predetermined servo pattern regions As out of the servo pattern regions As. When doing so, as one example, instead of carrying out the AC erase process on servo pattern regions As that are adjacent in the circumferential direction, the AC erase process is carried out on servo pattern regions As at intervals of at least one servo pattern region As (as one example, at intervals of three regions). Also, for the servo pattern regions As in which the AC erase process is carried out, the AC erase process is carried out on fifteen convex parts $11a$ on the data track pattern region At side of the preamble pattern region Ap cut of the thirty convex parts $11a$ inside the preamble pattern region Ap (one example of "some of the first recording regions that are set in advance" for the present invention). By doing so, the initialization process is completed for the data track pattern regions At and it becomes possible to write a measurement signal on fifteen convex parts 11a inside the preamble pattern regions Ap of some of the servo pattern regions As. Note that in the following processes, tracking servo control is carried out using the concave/convex patterns 11s in the servo pattern regions As for which the AC erase process was not carried out as concave/convex patterns for normal servo control.

Figure 6:
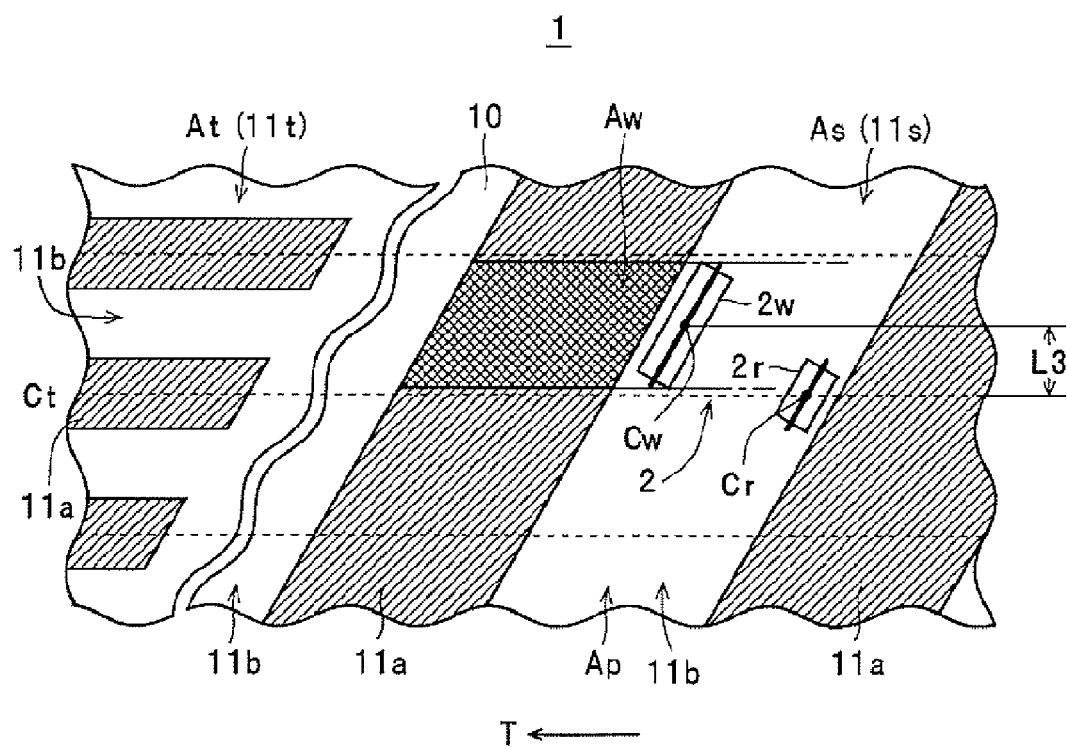
FIG. 6 is a plan view of the magnetic disk and the magnetic head in a state where a measurement signal is being written on a convex part in a preamble pattern region in a state where the reproducing head is made on-track.

Next, as shown in FIG. 6, the control unit 7 controls the controller 5 so that in a state where the reproducing head 2r is being made on-track to a track (for example a predetermined track in the outer periphery Ao) for which the offset is to be measured (i.e., in a state where the center Cr of the reproducing head 2r matches the track center Ct), measurement signals for measuring the offset are written on the fifteen convex parts 11a inside the preamble pattern regions Ap for which the erase process described above has been completed. More specifically, a DC magnetization process is carried out on the fifteen convex parts 11a inside the preamble pattern regions Ap using the recording head 2w. Here, as described earlier, in a state where a skew angle θ is produced in the inner periphery Ai and the outer periphery Ao of the magnetic disk 10, the recording head 2w will be made the distance L3 off track when the reproducing head 2r is made on-track. Accordingly, as shown in FIG. 6, when a measurement signal for measuring the offset has been written using the recording head 2w (i.e., when the DC magnetization process has been carried out), the center in the radial direction of the region Aw in which the measurement signal has been written (i.e., the region Aw that has been DC magnetized) is located away from the track center Ct.

Next, the control unit 7 reads the measurement signals written on the convex parts 11a inside the preamble pattern regions Ap and measures the offset OW based on results of reading the measurement signals. More specifically, the control unit 7 controls the controller 5 to read the measurement signals described above from the preamble pattern regions Ap inside the servo pattern regions As in a state where the reproducing head 2 has been moved to a measurement position set in advance (a position offset in the radial direction from the track center Ct of the target track being measured). When doing so, since the entire widths in the circumferential direction of the fifteen convex parts 11a inside the preamble pattern regions Ap have been DC magnetized by writing the measurement signals, the reproducing signal read from a preamble pattern region Ap using the reproducing head 2r has a pulse waveform corresponding to the formation pitch of the convex parts 11a inside the preamble pattern region Ap. After this, in a state where the reproducing head 2r has been moved in the radial direction by a predetermined amount set in advance (for example, around 1/20 of the track pitch), the control unit 7 has the measurement signals read from the preamble pattern region Ap inside each servo pattern region As.

When doing so, as shown in FIGS. 7 and 8, in a state where the reproducing head 2r almost overlaps the region Aw that has been DC magnetized in the width direction, the amplitude of the reproducing signal read from the preamble pattern region Ap becomes comparatively large (that is, a reproducing signal with a large output value is obtained). On the other hand, in a state (not shown) where only part of the reproducing head 2r overlaps the region Aw in the width direction, the amplitude of the reproducing signal read from the preamble pattern region Ap decreases. This means that whenever the reproducing head 2r moves, by obtaining and comparing the amplitude of the reproducing signal, it is possible to specify positions of the reproducing head 2r where the reproducing head 2r substantially overlaps the region Aw, and by doing so, it is possible to specify the length in the radial direction of the region Aw. Accordingly, the center in the radial direction of the region Aw, that is, a position corresponding to the center Cw of the recording head 2w when the measurement signal was written can be specified based on the specified length. More specifically, the control unit 7 specifies the head position of the reproducing head 2r when the amplitude of the reproducing signal read using the reproducing head 2r reaches its maximum value, or the center of a movement range of the reproducing head 2r from which a reproducing signal with a maximum amplitude is read, as the center in the radial direction of the region Aw. Next, the control unit 7 calculates the distance between the specified center and the track center Ct of the track to which the reproducing head 2r is being made on-track when the measurement signal was written in the region Aw as the offset OW, and stores the calculation result in the storage unit 8 as the offset data Do for that track.

After this, the control unit 7 sequentially carries out the write process for the measurement signals, the read process for the measurement signals, and the calculation process for the offset OW described above at intervals of several hundred tracks for the entire range from the outer periphery Ao to the inner periphery Ai of the magnetic disk 10. After the processes described above have been carried out at intervals of several hundred tracks across the entire range of the magnetic disk 10, the control unit 7 carries out an interpolation process based on the calculation results (i.e., the offset data Do stored in the storage unit 8) to calculate the offset OW for the tracks for which the processes such as the writing and reading of measurement signals were not carried out. By doing so, offset data Do for the entire magnetic disk 10 is stored in the storage unit 8 corresponding to each track.

Next, the measurement process for the head widths carried out by the hard disk drive 1 will be described with reference to the drawings.

Figure 9:
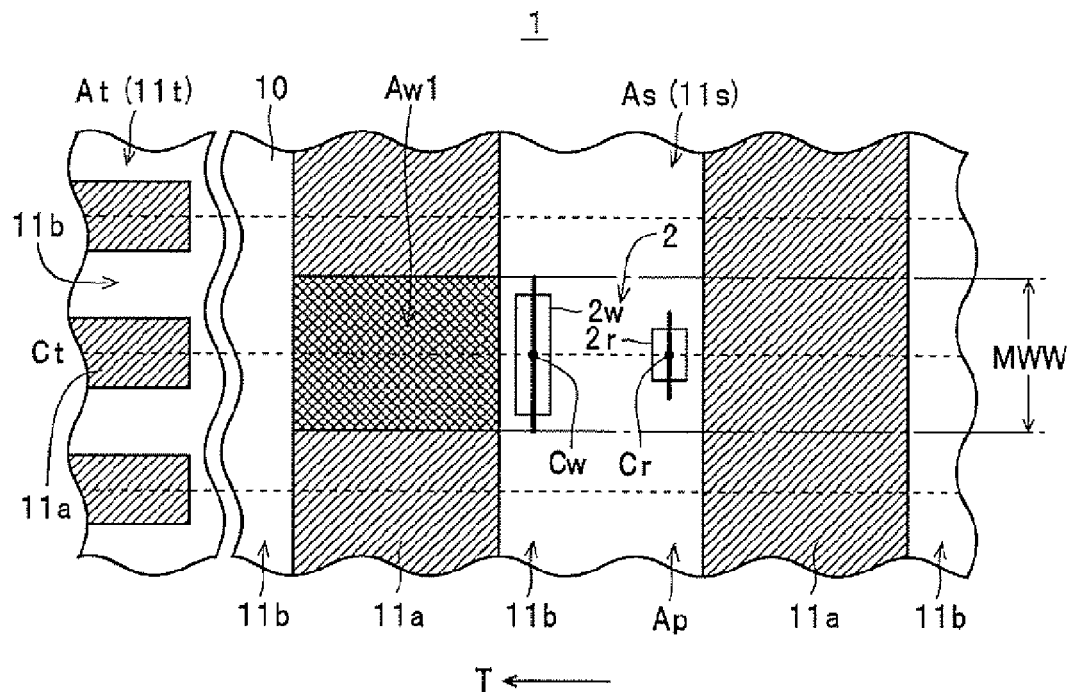
FIG. 9 is a plan view oft the magnetic disk and the magnetic head in a state where a measurement signal has been written on a convex part in the preamble pattern region in a state where the recording head is made on-track.

When the measurement process for the offset OW described above has been completed, the control unit 7 starts the measurement process for the magnetic write width MWW and the magnetic read width MRW described earlier. In this measurement process, the control unit 7 first carries out an AC erase process on the convex parts 11a inside the preamble pattern region Ap of each servo pattern region As in which measurement signals were written during the measurement process for the offset OW described above across the entire range from the inner periphery Ai to the outer periphery Ao of the magnetic disk 10. Next, as shown in FIG. 9, as one example, in a state where the recording head 2w has been made on-track to a predetermined track in the central periphery Ac of the magnetic disk 10 (i.e., in a state where the center Cw of the recording head 2w has been aligned with the track center Ct), measurement signals for measuring the widths of the heads are written (i.e., a DC magnetization process is carried out) on the fifteen convex parts 11a (one example of "some of the first recording regions that are set in advance" for the present invention) on the data track pattern region At side cut of the thirty convex parts 11a in the preamble pattern region Ap of each servo pattern region As in which measurement signals were written when the offset OW described above was measured.

Next, the control unit 7 reads the measurement signals written on the convex parts 11a in the preamble pattern regions Ap and obtains the magnetic write width MWW based on the result of such reading. More specifically, the control unit 7 controls the controller 5 to have the measurement signals described above read from the preamble pattern region Ap in each servo pattern region As in a state where the reproducing head 2r has been moved to a measurement position that is set in advance (i.e., a position where the reproducing head 2r has been moved by a predetermined amount from the track center Ct of the track being measured). Next, after the control unit 7 has moved the reproducing head 2r in the radial direction by a predetermined amount set in advance (for example, around 1/20 of the track pitch), the control unit 7 has the measurement signals read from the preamble pattern region Ap inside each servo pattern region As. When doing so, in the same way as during the measurement process for the offset OW described earlier, in a state where the reproducing head 2r almost overlaps the region Aw1 that has been DC magnetized in the width direction due to a measurement signal being written, the amplitude of the reproducing signal read from the preamble pattern region Ap becomes comparatively large (that is, a reproducing signal with a large output value is obtained). On the other hand, in a state where only part of the reproducing head 2r overlaps the region Aw1 in the width direction, the amplitude of the reproducing signal read from the preamble pattern region Ap decreases.

This means that by obtaining and comparing the amplitude of the reproducing signal whenever the reproducing head 2r moves, it is possible to calculate the length in the radial direction off the region Aw1, that is, the magnetic write width MWW based on the amplitude of the reproducing signal and the head position of the reproducing head 2r during reading. More specifically, as one example, in a profile of the head position of the reproducing head 2r and the amplitude, the profile width at a value that is half the maximum amplitude is set as the magnetic write width MWW. Next, the control unit 7 stores the calculated magnetic write width MW in the storage unit 8 as the write width data Dw. This completes the measurement process for the magnetic write width MWW. Note that although a construction that carries out a measurement process for the magnetic write width MWW in the central periphery Ac of the magnetic disk 10 has been described, it is also possible to use a construction that carries out the measurement process described above across she entire range from the inner periphery Ai to the outer periphery Ao of the magnetic disk 10. When doing so, in the same way as the measurement process for she offset OW described earlier, it is also possible to use a construction that carries out the measurement process for the magnetic write width MWW at intervals of several hundred tracks and an interpolation process to calculate the magnetic write width MWW of the tracks for which the measurement process is not carried out.

Figure 10:
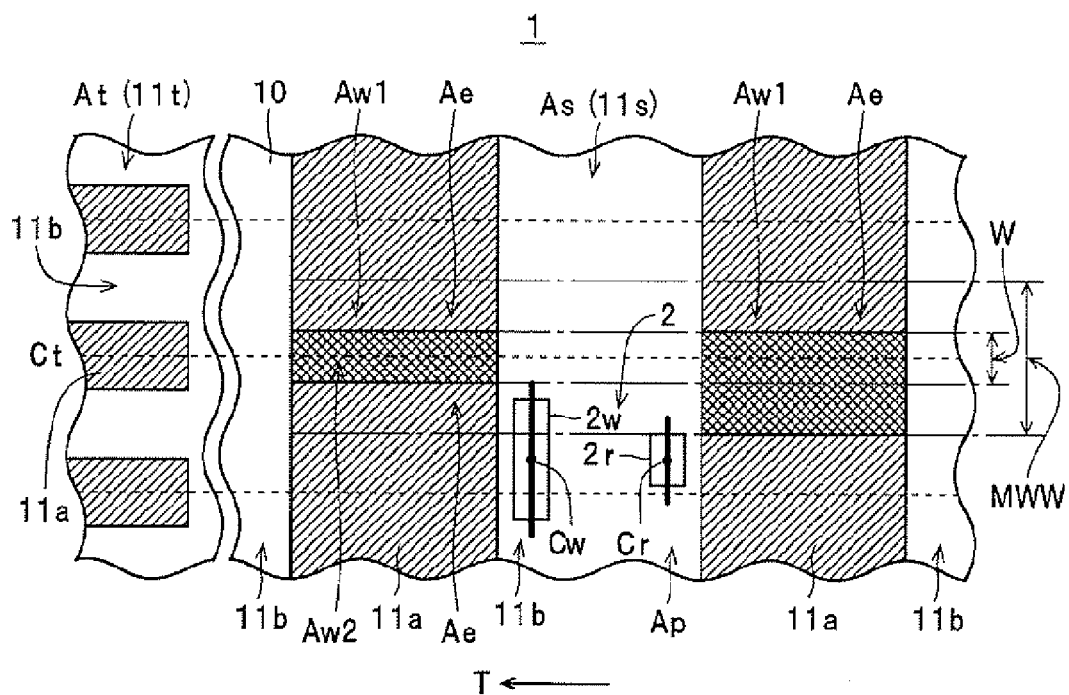
FIG. 10 is a plan view of the magnetic disk and the magnetic head in a state where an AC erase process has been carried out on an outer periphery part and an inner periphery part of a region where a measurement signal was written.

Next, the control unit 7 starts the measurement process for the magnetic read width MRW. During the measurement process for the magnetic read width MRW, as shown in FIG. 10, the control unit 7 first carries out an AC erase process on a region Ae that is an inner periphery one third and a region Ae that is an outer periphery one third in the radial direction of each region Aw1 where a measurement signal was written on the fifteen convex parts 11a inside the preamble pattern regions Ap during the measurement process for the magnetic write width MWW (i.e., each region Aw1 previously subjected to the DC magnetization process). By doing so, a state where only regions Aw2 whose width W in the radial direction is one third of the length (in this example, the magnetic write width MWW) in the radial direction of the region Aw1 are DC magnetized is produced (i.e., the width W in the radial direction of the regions Aw2 is made narrower than the magnetic read width MRW to be measured). Next, while moving the reproducing head 2r in the radial direction, the control unit 7 reads the measurement signals from the regions Aw2 using the reproducing head 2r and obtains the magnetic read width MRW described above based on the result of such reading. When doing so, as shown in FIG. 11, in a state where the entire width in the radial direction of the regions Aw2 that have been DC magnetized is positioned within the magnetic read width MRW of the reproducing head 2r, she amplitude of the reproducing signal read from the preamble pattern regions Ap becomes comparatively large (i.e., a reproducing signal with a large output value is obtained). On the other hand, when only part of the width in the radial direction of the regions Aw2 that have been DC magnetized is positioned within the magnetic read width MRW of the reproducing head 2r, the amplitude of the reproducing signal read from the preamble pattern regions Ap decreases.

This means that by obtaining and comparing the amplitude of the reproducing signal whenever the reproducing head 2r moves, it is possible to calculate the magnetic read width MRW of the reproducing head 2r based on the amplitude and the head position of the reproducing head 2r during reading. More specifically, as one example, in a profile of the head position of the reproducing head 2r and the amplitude, the profile width at a value that is half the maximum amplitude is set as the magnetic read width MRW. Next, the control unit 7 stores the calculated magnetic read width MRW in the storage unit 3 as the read width data Dr. Note that although a construction that carries out the measurement process for the magnetic read width MRW described above in the central periphery Ac of the magnetic disk 10 has been described, it is also possible to use a construction that carries out the measurement process described above across the entire range from the inner periphery Ai to the outer periphery Ao of the magnetic disk 10. When doing so, in the same way as the measurement process for the offset OW described earlier, it is possible to use a construction that carries out the measurement process for the magnetic read width MRW at intervals of several hundred tracks and an interpolation process to calculate the magnetic read width MRW of the tracks for which the measurement process is not carried out. This completes the measurement process for the magnetic read width MRW. After this, the control unit 7 uses the recording head 2w to carry out a DC magnetization process on all of the preamble pattern regions Ap used in the measurement processes described above. By doing so, it becomes possible to use all thirty of the convex parts 11a formed in the preamble pattern region Ap in each servo pattern region As as convex parts used as preamble patterns.

In this way, according to the hard disk drive 1, by measuring a predetermined parameter for the present invention by writing measurement signals using the recording head 2w on the first recording regions that are continuously formed in the radial direction out of the convex parts 11a formed in the servo pattern regions As (as one example, the convex parts 11a used as preamble patterns that are formed in the preamble pattern regions Ap) and DC magnetizing the first recording regions (i.e., the convex parts 11a) used during the measurement process for the offset OW and the measurement process for the magnetic write width MWW and the magnetic read width MRW after such measurement processes have been completed, it becomes possible to use such first recording regions (i.e., the convex parts 11a) as normal servo patterns (in this example, as preamble patterns). Accordingly, it becomes possible to measure the predetermined parameter for the magnetic head 2 without having to provide regions dedicated to the measurement processes that cannot be used to record data or to record servo patterns. As a result, it is possible to provide a hard disk drive 1 that can measure the predetermined parameters of the recording head 2w and the reproducing head 2r without reducing the recordable area.

According to the hard disk drive 1, by measuring the distance (i.e., the offset OW) in the radial direction between the center Cw of the recording head 2w and the center Cr of the reproducing head 2r as the measurement of a predetermined parameter according to the present invention, it is possible to properly measure the offset OW for the entire range from the inner periphery Ai to the outer periphery Ao of the magnetic disk 10 in a hard disk drive 1 where the relative positional relationship between the recording head 2w and the reproducing head 2r differs due to manufacturing errors and differences between individual components. As a result, it is possible to make the recording head 2w and the reproducing head 2r reliably on-track to each track.

In addition, according to the hard disk drive 1, by measuring the magnetic write width MWW of the recording head 2w and the magnetic read width MRW of the reproducing head 2r as the measurement of predetermined parameters according to the present invention, it is possible to properly measure the magnetic write width MWW and the magnetic read width MRW in a state where the magnetic disk 10 actually installed in the hard disk drive 1 has been combined with the magnetic head 2 (i.e., the recording head 2w and the reproducing head 2r). By doing so, various control parameters for tracking servo control can be finely adjusted individually for each actual hard disk drive 1 based on the measured magnetic write width MWW and the magnetic read width MRW. It is also possible to finely adjust the write current based on the measured magnetic write width MWW and to adjust the gain based on the measured magnetic read width MRW. Accordingly, it is possible to provide a hard disk drive 1 that can reliably record the data and can reliably read the recorded data and the servo data across the entire range from the inner periphery Ai to the outer periphery Ao of the magnetic disk 10.

According to the hard disk drive 1, when measuring the predetermined parameters for the present invention, by writing measurement signals on the first recording regions (the convex parts 11a) inside servo pattern regions As that are not adjacent to the servo pattern regions where the first recording regions on which the measurement signals have been written are formed in the circumferential direction, it is possible to execute proper tracking servo control during the measurement processes using the concave/convex patterns 11s inside the servo pattern regions As on whose first recording regions (i.e., the convex parts 11a) the measurement signals were not written (i.e., whose first recording regions were not DC magnetized) as concave/convex patterns for normal servo patterns. Accordingly, it is possible to sufficiently improve the reliability of the measurement results produced by the measurement processes.

It should be noted that the present invention is not limited to the construction and method described above. For example, although an example where the measurement process for the magnetic write width MWW and the measurement process for the magnetic read width MRW are carried out in the mentioned order following the completion of the measurement process for the offset OW has been described, the method of measuring a parameter according to the present invention is not limited to this, and it is possible to use a method of measuring a parameter where only one of the measurement process for the offset OW, the measurement process for the magnetic write width MWW and the measurement process for the magnetic read width MRW is carried out. Also, as shown in FIG. 12, although the "non-recording regions" for the present invention are constructed of concave parts 11b (i.e., spaces where no magnetic material is present) formed between adjacent convex parts 11a on the magnetic disk 10 described above, the "non-recording regions" for the present invention are not limited to this. More specifically, like a magnetic disk 10A shown in FIG. 13, for example, it is possible to fill the concave parts 11b with a variety of materials whose ability to retain a magnetic signal in a readable manner is lower than that of the magnetic material that constructs the magnetic layer 22 described above or a variety of materials that effectively do not have such ability (as examples, a non-magnetic material 23 such as silicon oxide or a non-magnetic resin material) to produce non-recording regions whose ability to retain a magnetic signal in a readable manner is lower than that of the recording regions (i.e., the formation regions of the convex parts 11a) described above or which effectively do not have such ability. By using such construction, it is possible to make the surface of the magnetic disk 10A smooth, resulting in the ability to make the flying height of the magnetic head 2 more uniform across the entire magnetic disk 10A.

Note that for the magnetic disks 10, 10A shown in FIGS. 12 and 13, although a state where the magnetic layer 22 is formed directly on the substrate 21 has been shown, in reality a variety of functional layers such as a soft magnetic layer and an intermediate layer are formed between the substrate 21 and the magnetic layer 22. Also, a protective layer to prevent damage to the magnetic disks 10, 10A is formed on the magnetic layer 22 (the convex parts 11a) and on the non-magnetic material 23 that fills the concave parts 11b. Fur ease of understanding the present invention, such layers have been omitted from the drawings and the description. Also for the magnetic disk 10A shown in FIG. 13 and the magnetic disks 10B to 10E that will be described later, component elements with the same functions as in the magnetic disk 10 described above have been assigned the same reference numerals and description thereof has been omitted.

Figure 14:
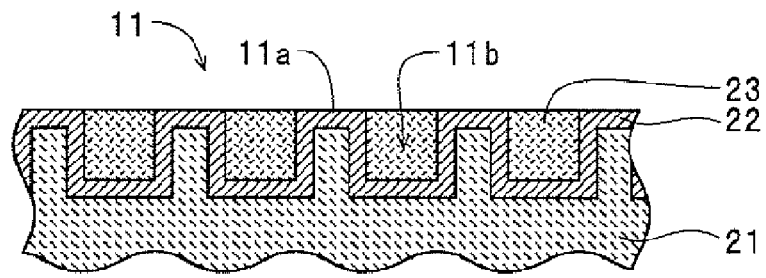
FIG. 14 is a cross-sectional view of yet another magnetic disk.
Figure 15:
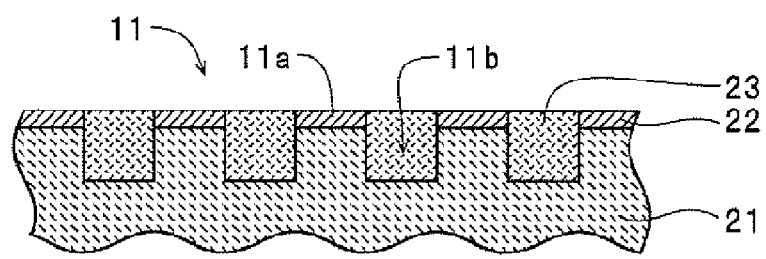
FIG. 15 is a cross-sectional view of yet another magnetic disk.

Also, on the magnetic disks 10 and 10A described above, although the "recording regions" for the present invention are constructed of the convex parts 11a that are almost entirely formed of magnetic material (the magnetic layer 22) from the base ends to the protruding ends thereof, a "pattern with recording regions and non-recording regions" for the present invention is not limited to this More specifically, like the magnetic disk 10B shown in FIG. 14, for example, by forming a thin magnetic layer 22 so as to cover a concave/convex pattern formed on the substrate 21 (i.e., a concave/convex pattern where the positional relationship of the concavities and convexities is the same as in the concave/convex pattern 11), it is possible to construct a concave/convex pattern 11 that corresponds to a "pattern with recording regions and non-recording regions" for the present invention and is composed of a plurality of convex parts 11a (recording regions) whose surfaces are formed of magnetic material and a plurality of concave parts 11b (non-recording regions) whose base surfaces are formed of the magnetic material. Also, like the magnetic disk 10C shown in FIG. 15, it is possible to construct a concave/convex pattern 11 that corresponds to a "pattern with recording regions and non-recording regions" for the present invention including a plurality of convex parts 11a (recording regions) where only protruding end parts of the convex parts 11a in the concave/convex pattern 11 on the magnetic disks 10, 10A are formed of the magnetic layer 22 and the base end parts of the convex parts 11a are formed of a non-magnetic material or a soft magnetic material (in this example, the substrate 21).

Figure 16:
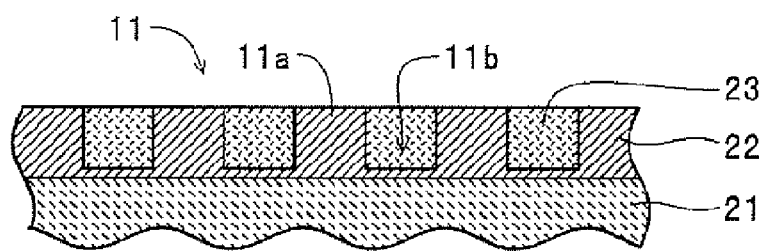
FIG. 16 is a cross-sectional view of yet another magnetic disk.

Also, like the magnetic disk 10D shown in FIG. 16, it is possible to construct a concave/convex pattern 11 that corresponds to a "pattern with recording regions and non-recording regions" for the present invention by forming not only the convex parts 11*a* (recording regions) but also the base parts of the concave parts 11*b* (non-recording regions) of the magnetic layer 22. In this way, when the recording regions of the magnetic recording medium according to the present invention are constructed of convex parts, by forming at least the protruding end parts of the convex parts of a magnetic material, it is possible to keep the ability to retain a magnetic signal in a readable manner sufficiently higher than that of the non-recording magnetic regions.

The magnetic recording medium according to the present invention is also not limited to having a pattern where the recording regions are constructed of convex parts and the non-recording regions are constructed of concave parts. More specifically, by forming a concave/convex pattern (a concave/convex pattern, in which the convex parts are composed of a non-magnetic material or the like) where the positional relationship between the concavities and convexities is reversed compared to the concave/convex pattern 11 described above, on a layer formed from a variety of materials whose ability to retain a magnetic signal in a readable manner is low or a variety of materials that effectively do not have such ability (for example, a non-magnetic material) and filling the concave parts in the concave/convex pattern with a variety of materials whose ability to retain a magnetic signal in a readable manner is high (for example, a magnetic material), it is possible to construct a magnetic recording medium according to the present invention with a pattern (not shown) where the recording regions are composed of concave parts filled with magnetic material, and the non-recording regions are composed of convex parts. In addition, by carrying out by irradiation with ions or the like, it is possible to change the magnetic characteristics of parts of a continuous magnetic layer formed on a substrate to form the non-recording regions for the present invention in the continuous magnetic layer, and by doing so, it is possible to construct a magnetic recording medium by forming a "pattern with recording regions and non-recording regions" for the present invention (not shown).

Also, although an example where measurement signals are written using the convex parts 11*a* formed in the preamble pattern regions Ap as the first recording regions for the present invention has been described, the present invention is not limited to this and as another example, it is possible to use a construction where the measurement processes described above are carried out using the convex parts 11*a* for sector address patterns formed in the address pattern regions as the first recording regions. Also, like the magnetic disk 10E shown in FIG. 17, for example, when the burst patterns in each burst pattern region Ab are formed by a concave/convex pattern 11 (another example of a "pattern with recording regions and non-recording regions" for the present invention) in which a plurality of convex parts 112 (recording regions) and a plurality of concave parts 11*b* (non-recording regions) shaped as zigzags in the circumferential direction are disposed in the radial direction, it is possible to use a construction where the measurement processes described above are carried out using the convex parts 11*a* for the burst patterns as the "first recording regions" for the present invention. For a convex part 11*a* inside a burst pattern region Ab of the magnetic disk 10E, the part shown by the arrow E in FIG. 17 is regarded as being "formed continuously in the radial direction".

Figure 17:
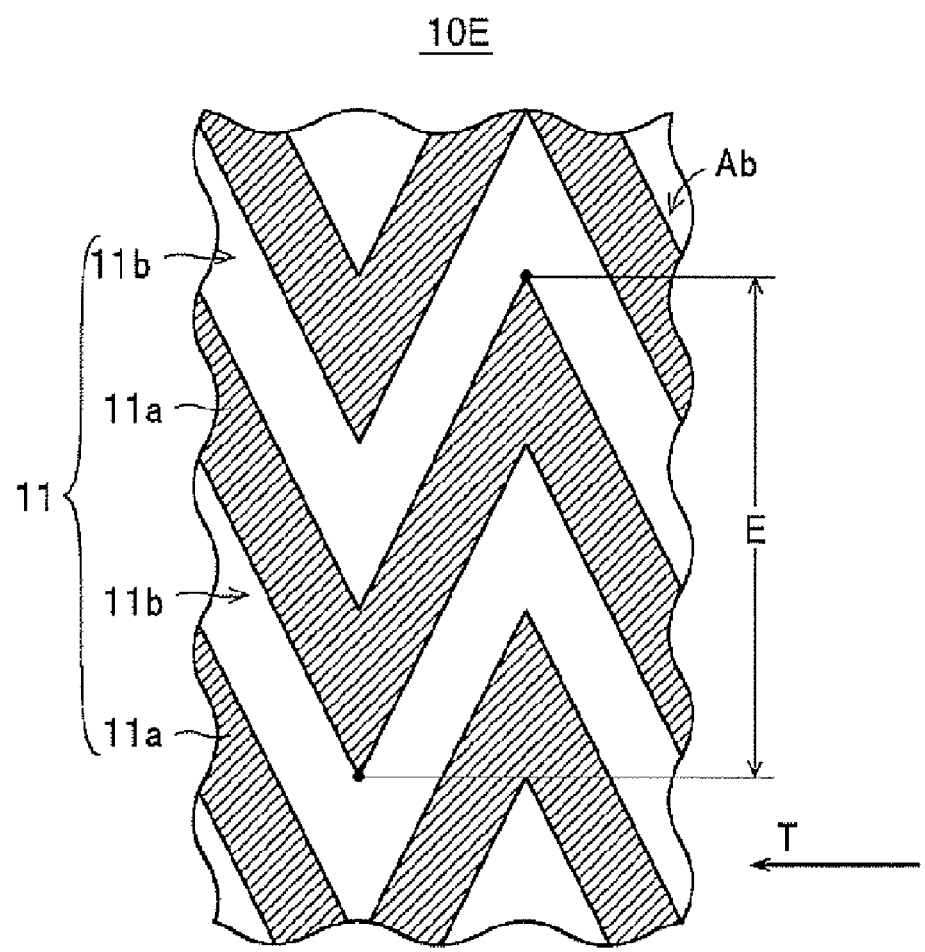
FIG. 17 is a plan view of a burst pattern region of yet another magnetic disk.

Note that as shown in FIG. 17, the expression "formed continuously in the radial direction" for the present invention includes not only a state where parts are formed continuously along a direction perpendicular to the circumferential direction (i.e., the direction shown by the arrow T in FIG. 17) and includes a state where parts are formed continuously along a direction that intersects the radial direction at an acute angle. With such constructions also, by DC magnetizing the convex parts 11*a* on which the measurement signals were written after the measurement processes have been completed, it becomes possible to use the convex parts 11*a* as normal servo patterns, and therefore it is possible to provide a hard disk drive 1 that can measure a predetermined parameter for the recording head 2*w* and the reproducing head 2*r* without reducing the recordable area. When doing so, the convex parts on which the measurement signals are written as first recording regions for the present invention should preferably have a length in the radial direction of at least twenty times the track pitch so that the measurement process for the offset OW described earlier and the measurement process for the magnetic write width MWW and the magnetic read width MRW can be carried out reliably.

Also, although a construction that finds the offset data Do by measuring the offset OW at intervals of several hundred tracks across the entire range from the inner periphery Ai to the outer periphery Ao of the magnetic disk 10 and calculates the offset data Do for the remaining tracks by carrying out an interpolation process has been described, the present invention is not limited to this and it is possible to use a construction that carries out the measurement process described above for every track from the inner periphery Ai to the outer periphery Ao of the magnetic disk 10. In the same way, the measurement process for the magnetic write width MWW and the magnetic read width MRW is not limited to being carried out in only the central periphery Ac of the magnetic disk 10 or at intervals of several hundred tracks across the entire range from the inner periphery Ai to the outer periphery Ao of the magnetic disk 10 and it is possible to use a construction where the measurement processes described above are carried out for every track from the inner periphery Ai to the outer periphery Ao of the magnetic disk 10. In addition, when using a construction that carries out the processes for measuring the predetermined parameters for the present invention at intervals of a predetermined number of tracks, it is possible to carry out the measurement processes at intervals of a freely chosen number of tracks (i.e., one or more tracks). Here, it is possible to use a construction that carries out the measurement processes for any two tracks between the inner periphery Ai and the outer periphery Ao on the magnetic disk 10 to find the distances L1, L2 for the equation "distance L3=distance L1×sin θ+distance L2×cos θ" given earlier based on the obtained measurement results (calculation results) and the skew angle θ for the two tracks subjected to the measurement processes so as to calculate the distance L3 for each track for which the measurement processes are not carried out based on the skew angle θ for each track. By using this construction, compared to a construction that carries out the measurement processes on every track, for example, it is possible to measure the offset OW and the like in a short time.

Also, if measurement signals are written during the measurement processes on only some out of the servo pattern regions As that are disposed in the direction of rotation, it is also possible to use a construction where measurement signals are written on all of the thirty convex parts 11*a* inside the preamble pattern regions Ap of such servo pattern regions As. In addition, although a construction that measures the predetermined parameters for the present invention by writing the measurement signals on some out of the servo pattern regions As that are adjacent in the circumferential direction (for example, servo pattern regions As at intervals of three servo pattern regions As) and uses the convex parts 11*a* of the remaining servo pattern regions As as the convex parts 11*a* of a normal servo pattern has been described, the present invention is not limited to this. As one example, to make it possible to carry out tracking servo control properly, it is possible to use a construction that carries out the measurement processes by writing measurement signals on the convex parts 11a in the preamble pattern region Ap of two consecutive servo pattern regions As out of three servo pattern regions As that are consecutive in the circumferential direction and using the servo patterns in the remaining servo pattern region As for tracking control. It is also possible to use a construction that measures the predetermined parameters for the present invention by writing the measurement signals in an arbitrary servo pattern region As out of servo pattern regions As that are consecutive in the circumferential direction (i.e., by writing measurement signals inside one servo pattern region As per rotation of the magnetic disk 10).

As another example, it is possible to use a construction that carries out the measurement processes described above by writing measurement signals on the fifteen convex parts 11a on the data track pattern regions At side (another example of "some of the first recording regions that are set in advance" for the present invention), for example, out of the thirty convex parts 11a formed inside the preamble pattern region Ap of every servo pattern region As and carries out tracking servo control using the servo signals obtained by reading the remaining fifteen convex parts 11a on which measurement signals were not written. In this way, when measuring the predetermined parameters for the present invention, by writing measurement signals on only predetermined convex parts 11a out of all the convex parts (i.e., the first recording regions) 11a formed inside the servo pattern regions As (in this example, fifteen out of the thirty convex parts 11a formed inside each preamble pattern region Ap), it is possible to carry out proper tracking servo control during the measurement processes using the convex parts 11a on which measurement signals were not written during the measurement processes (i.e. the convex parts 11a that were not DC magnetized) as normal servo patterns (in this example, preamble patterns). Accordingly, it is possible to sufficiently improve the reliability of the measurement results produced by the measurement processes. Note that the number of convex parts 11a onto which the measurement signals are to be written out of the convex parts 11a in a preamble pattern region Ap can be set as any freely chosen number in a range where proper tracking servo control can be carried out using the remaining convex parts 11a on which measurement signals are not written.

Also, although the offset OW, the magnetic write width MWW, and the magnetic read width MRW are measured during the measurement processes based on the reproducing signal for the DC magnetized regions Aw (or the regions Aw1, Aw2) after the first recording regions for the present invention have been subjected to an AC erase process and then DC magnetized by writing the measurement signals in the example described above, she present invention is not limited to this. For example, it is also possible to use a construction where in a state where the entire area of every first recording region for the present invention has been DC magnetized, an AC erase process is carried out using the recording head 2w (another example of "writing measurement signals") on regions corresponding to the regions Aw, Aw1, and Aw2 that were DC magnetized during the measurement processes described earlier and the offset OW, the magnetic write width MWW, and the magnetic read width MRW are then measured based on reproducing signals for such regions. Note that in this case, during the measurement process for the magnetic read width MRW, by DC magnetizing both sides in the radial direction (i.e., the regions corresponding to the regions Ae described earlier) of the region Aw1 on which the AC erase process has been carried cut, it is possible to read measurement signals in a state where only a region that corresponds to the region Aw2 has been AC erased. In the method of measuring that writes measurement signals by carrying out an AC erase process, a reproducing signal with a small amplitude is obtained at head positions where a reproducing signal with a large amplitude was obtained in the measurement process described earlier and a reproducing signal with a large amplitude is obtained at head positions where a reproducing signal with a small amplitude was obtained. Accordingly, when measuring the offset OW, for example, the head position of the reproducing head 2r where the amplitude of the reproducing signal reaches a minimum or the center of a range of head positions where a reproducing signal with the minimum amplitude is read is specified as the center of the region Aw in the radial direction. By doing so, the offset OW can be measured in the same way as in the measurement process described earlier.

Also, although an example where the entire widths in the radial direction of the convex parts 11a are DC magnetized by writing measurement signals has been described, the present invention is not limited to this and it is possible to use a construction where measurement signals whose wavelength is shorter than the formation pitch of the convex parts 11a (for example, measurement signals of a frequency that is higher than the frequency of the reproducing signal produced from a preamble pattern) are written on the first recording regions and the offset OW, the magnetic write width MWW, and the magnetic read width MRW are measured by reading the written measurement signals. Here, to obtain a reproducing signal with a large output value, at least one cycle of the measurement signal should preferably be written on each convex part 11. Accordingly, when the convex parts 11a inside the preamble pattern regions Ap are used as the first recording regions, measurement signals with a wavelength that is no greater than half the formation pitch of the preamble patterns should preferably be recorded. Note that as the method of writing the measurement signals, it is possible to use a method of writing measurement signals of a predetermined frequency on the first recording regions to be written in a state where the entire areas of the first recording regions to be written have been subjected to AC erasing or a method of writing measurement signals of a predetermined frequency on the first recording regions to be written in a state where the entire areas of the first recording regions to be written have been subjected to DC magnetizing.

Also, the magnetic recording medium according to the present invention is not limited to a medium, such as the magnetic disk 10 and the like, where data track patterns (the concave/convex patterns 11t) are formed in the data recording regions At by concave/convex patterns 11 that include a plurality of concentric or spiral convex parts 11a (i.e., recording regions), and it is possible to apply the present invention to a patterned medium where recording regions (as one example, convex parts 11a) that construct the data recording tracks in the data track patterns sandwich non-recording regions (as one example, concave parts 11b) in the circumferential direction of the magnetic recording medium. The magnetic recording medium according to the present invention can also be applied to both magnetic recording media for perpendicular recording and magnetic recording media for longitudinal recording. In addition, although a construction where the control unit 7 of the hard disk drive 1 carries out the measurement processes has been described, the present invention is not limited to this and it is possible to use a construction where the hard disk drive 1 is connected to a testing apparatus (not shown) and the measurement processes described above are carried out by a control unit of the testing apparatus. With this construction, the hard disk drive 1 and the testing apparatus together construct a "recording/reproducing apparatus" for the present invention.

What is claimed is:

1. A recording/reproducing apparatus comprising:
a magnetic recording medium on which data track patterns are formed in data track pattern regions by a pattern with recording regions and non-recording regions and on which servo patterns are formed in servo pattern regions by the pattern with the recording regions and the non-recording regions;
a recording head that writes signals on the magnetic recording medium;
a reproducing head that reads signals written on the magnetic recording medium; and
a control unit that controls writing of the signals by the recording head and reading of the signals by the reproducing head and measures a predetermined parameter for at least one of the recording head and the reproducing head by writing and reading measurement signals on the magnetic recording medium,
wherein when measuring the predetermined parameter, the control unit writes the measurement signals using the recording head on first recording regions that are formed continuously in a radial direction of the magnetic recording medium out of a plurality of the recording regions that are formed in the servo pattern regions and construct the servo patterns, reads the measurement signals using the reproducing head, and measures the predetermined parameter based on a result of reading the measurement signals.

2. A recording/reproducing apparatus according to claim 1, wherein as measurement of the predetermined parameter, the control unit measures a distance in the radial direction of the magnetic recording medium between a center of a length of the recording head in a direction corresponding to the radial direction and a center of a length of the reproducing head in a direction corresponding to the radial direction.

3. A recording/reproducing apparatus according to claim 1, wherein as measurement of the predetermined parameter, the control unit measures at least one of a magnetic write width of the recording head and a magnetic read width of the reproducing head.

4. A recording/reproducing apparatus according to claim 1, wherein when measuring the predetermined parameter, the control unit writes the measurement signals on only some of the first recording regions that are set in advance out of the first recording regions formed in the servo pattern regions.

5. A recording/reproducing apparatus according to claim 1, wherein when measuring the predetermined parameter, the control unit writes the measurement signals on the first recording regions in servo pattern regions that are not adjacent to the servo pattern regions where the first recording regions on which the measurement signals have been written are formed in a circumferential direction of the magnetic recording medium.

6. A method of measuring a parameter for a recording/reproducing apparatus including: a magnetic recording medium on which data track patterns are formed in data track pattern regions by a pattern with recording regions and non-recording regions and on which servo patterns are formed in servo pattern regions by the pattern with the recording regions and the non-recording regions; a recording head that writes signals on the magnetic recording medium; and a reproducing head that reads signals written on the magnetic recording medium, the method comprising writing and reading measurement signals on the magnetic recording medium of the recording/reproducing apparatus, thereby measuring a predetermined parameter for at least one of the recording head and the reproducing head, wherein:
the writing the measurement signals is performed using the recording head on first recording regions that are formed continuously in a radial direction of the magnetic recording medium out of a plurality of the recording regions that are formed in the servo pattern regions and construct the servo patterns;
the reading the measurement signals is performed using the reproducing head; and
the measuring the predetermined parameter is performed based on a result of the reading the measurement signals.

* * * * *